Figure 1:
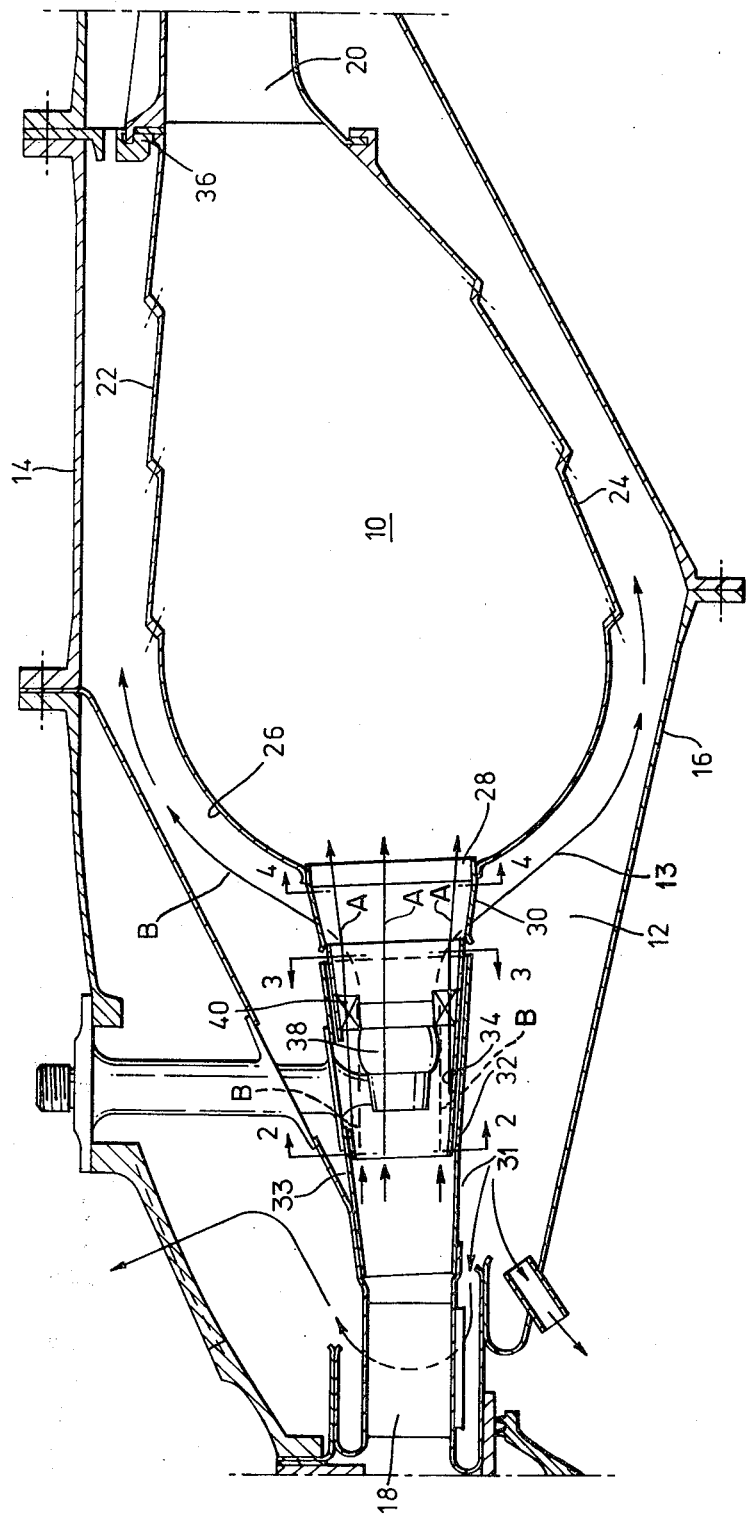

United States Patent [19]

Pask

[11] 4,177,637
[45] Dec. 11, 1979

[54] INLET FOR ANNULAR GAS TURBINE COMBUSTOR

[75] Inventor: George Pask, Stanton-by-Bridge, England

[73] Assignee: Rolls-Royce Limited, London, England

[21] Appl. No.: 862,193

[22] Filed: Dec. 19, 1977

[30] Foreign Application Priority Data

Dec. 23, 1976 [GB] United Kingdom ............... 53950/76

[51] Int. Cl.² ........................... F02C 3/06; F02C 3/08
[52] U.S. Cl. ................................ 60/39.36; 60/39.74 R
[58] Field of Search ................ 60/39.36, 39.31, 39.32, 60/39.71, 39.74 R, 39.74 B, 39.65, 39.23; 431/352

[56] References Cited

U.S. PATENT DOCUMENTS

| 3,026,675 | 3/1962 | Vesper et al. ...................... 60/39.32 |
| 3,372,542 | 3/1968 | Sevetz ................................ 60/39.36 |
| 3,394,543 | 7/1968 | Slattery ......................... 60/39.74 R |
| 3,398,529 | 8/1968 | Schmitz et al. ................ 60/39.74 R |
| 3,667,221 | 6/1972 | Taylor .............................. 60/39.74 R |
| 3,738,106 | 6/1973 | Stein et al. ......................... 60/39.32 |
| 3,834,159 | 9/1974 | Vdoviak ........................ 60/39.74 R |

*Primary Examiner*—Carlton R. Croyle
*Assistant Examiner*—Thomas I. Ross
*Attorney, Agent, or Firm*—Cushman, Darby & Cushman

[57] ABSTRACT

Combustion equipment for a gas turbine engine comprises an annular flame tube having a circumferential array of upstream projecting pots or vortex generators at its upstream end, an annular diffusing passageway located upstream of the pots and terminating adjacent the upstream ends of the pots, and a plurality of tubular ducts, one extending from the annular diffusing passageway to the upstream end of each pot.

6 Claims, 5 Drawing Figures

INLET FOR ANNULAR GAS TURBINE COMBUSTOR

This invention relates to combustion equipment for gas turbine engines. A combustion chamber for a gas turbine engine is subject to different environmental conditions and thus must overcome various problems associated with these conditions. The combustion chamber is generally provided with a fast moving gas stream and must provide not only for ignition of fuel in this fast moving gas stream, but also continuation of the combustion process and preferably full combustion of the fuel in a relatively short period of transit time in order to reduce the quantity of pollutants produced.

There is a continuing demand for more power per unit volume of a combustion chamber and per a given mass of fuel, and this can only be achieved by providing more air in the combustion chamber which generally means even higher velocities of airflow.

A recent design of combustion chamber which can cope with higher velocities of airflow is annular in shape with an annular flame tube mounted inside it, the flame tube having a circumferential array of upstream projecting pots or vortex generators at its upstream end. Fuel is introduced into the pots and mixed with enough air to commence ignition, the remaining air necessary for combustion being supplied through perforations in the walls of the flame tube.

It is an object of the invention to provide an improved combustion chamber of this kind.

According to the present invention combustion equipment for a gas turbine engine comprises an annular flame tube having a circumferential array of upstream projecting pots or vortex generators at its upstream end, an annular diffusing passageway located upstream of the pots and terminating adjacent the upstream ends of the pots, and a plurality of tubular ducts, one extending from the annular diffusing passageway to the upstream end of each pot. Preferably a fuel injection device is located within each tubular duct. The upstream end of each tubular duct is preferably located in a position intermediate the ends of the annular diffusing passageway. The diameter of the upstream end of each tubular duct is preferably substantially the same as the radial width of the annular diffusing passageway at that position.

The annular diffusing passageway and the main body of the flame tube may be relatively movable. In this case, each tubular duct and/or each upstream projecting pot must be movable relative to the annular diffusing passageway and/or the main body of the flame tube.

The invention also comprises a gas turbine engine having combustion equipment as set forth above.

Figure 2:
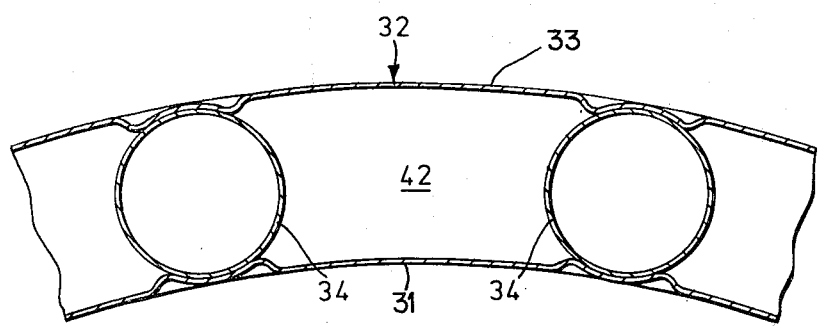
Figure 3:
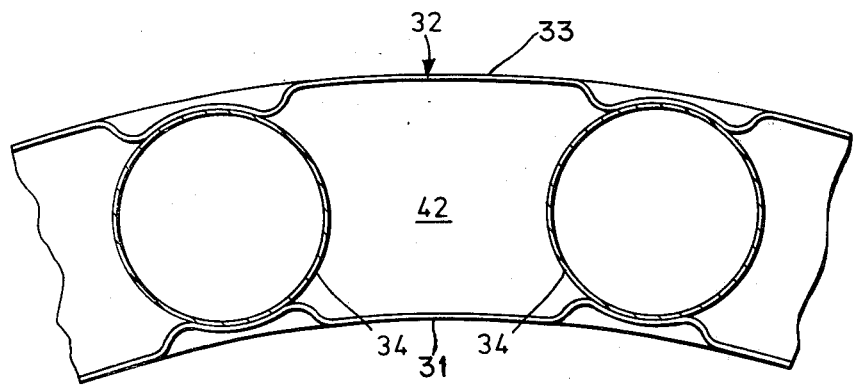
Figure 4:
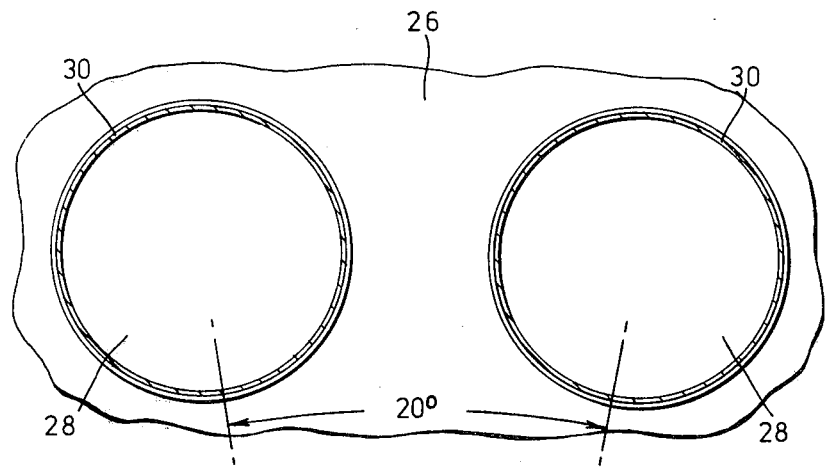
Figure 5:
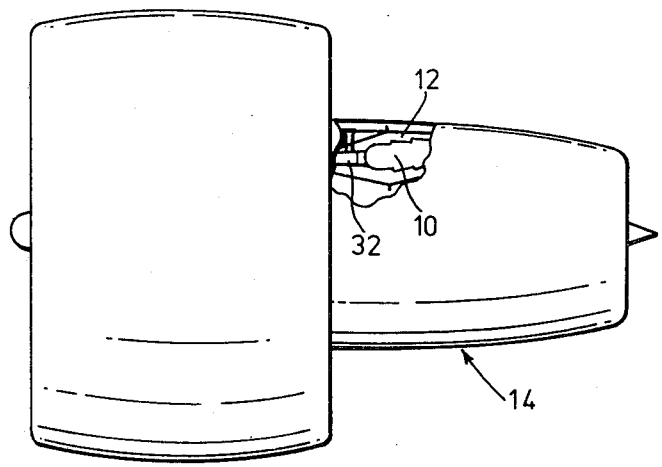

An embodiment of the invention will now be described by way of example only with reference to the accompanying drawings, in which:

FIG. 1 is a cross-sectional view of combustion equipment according to the present invention, FIGS. 2, 3 and 4 are partial sectional views of the equipment taken from the lines 2—2, 3—3 and 4—4 on FIG. 1, and FIG. 5 is a partially cutaway view of a gas turbine engine having combustion equipment according to the invention.

FIG. 1 illustrates combustion equipment for a gas turbine engine 14 comprising an annular flame tube 10 which is mounted within an annular combustion chamber 12. The combustion chamber consists of an annular outer wall 14 and an annular inner wall 16 which are suitably connected upstream and downstream of the flame tube 10. The upstream end of the combustion chamber is adapted to receive a supply of compressed air from a compressor (not shown) via guide vanes 18, and the downstream end is provided with nozzle guide vanes 20 to direct combustion products into a turbine (not shown).

The flame tube 10 also comprises an annular outer wall 22 and an annular inner wall 24, the walls being connected at their upstream ends by a curved annular end plate 26 and supported at their downstream ends by the nozzle guide vane 20 supporting structure. The end plate 26 is formed with a plurality of equally spaced holes 28 in each of which is located a truncated conical pot 30.

Mounted at the upstream end of the combustion chamber 12 is an annular diffuser 32 having radially spaced walls 31 and 32 to define an annular diffusing passageway. This extends from immediately downstream of the guide vanes 18, to adjacent the ends of the pots 30. Inside the annular diffuser 32 is secured a plurality of tubular diffusing ducts 34, each of which extends from the diffuser 32 into the end of one of the pots 30.

The ducts 34 are secured inside the diffuser 32 and serve to hold the radially spaced walls 31 and 33 of the diffuser 32 together. They are thus rigid with the diffuser and with the upstream end of the combustion chamber 12. Since the flame tube 10 is rigidly mounted to the downstream end of the combustion chamber 12 or "encastre" (except for an arrangement 36 to permit the outer wall 22 to expand radially) it will be seen that when the combustion equipment is in operation the temperatures in the equipment will cause relative movement due to relative expansion between the ends of the ducts 34 and the holes 28. This movement is accommodated by mounting the pots 30 so that they may move both relative to the flame tube end plate 26 and the ducts 34 whilst still retaining reasonable gas seals between the joints. Mounted inside each duct 34 is a fuel burner 38 which is spaced from the walls of the duct 34 and located by swirl vanes 40.

The burner shown in FIG. 1 is of the type which is removable from outside the combustion chamber 12, but a burner integral with the duct 34 with merely removable fuel feed pipes is preferred for an improved flow of air along the duct 34.

In operation compressed air from the compressor enters the combustion equipment via the guide vanes 18 and into the annular diffuser duct 32. Some of the air, represented by the arrows A, then passes into the ducts 34 and is swirled, mixed with fuel and ignited on reaching the pots 32 before passing into the flame tube 10. The remainder of the air, represented by the arrows B, passes between the ducts 34 along the spaces 42 (see FIGS. 2 and 3) and on reaching the end of the diffuser 32, impinges on the end plate 26 between the pots 30, thus helping normally to cool the flame tube. This air then passes around the outside surface of the flame tube, some being used for cooling the internal surfaces of the flame tube walls 22,24 and some for dilution of the combustion gases. Some of this air is used for operating other engine and aircraft facilities, such as aircraft cabin pressurisation.

The presence of the ducts 34 extending between the diffuser 32 and the pots 30 is intended to give an improved air flow into the pots with a reduction in turbulence and thus enable a high mass flow rate of air through the engine with consequent improvements in performance.

I claim:

1. Combustion equipment for receiving compressed air from a compressor of a gas turbine engine, said combustion equipment comprising:

an annular flame tube defined by radially spaced walls and an upstream end plate having a plurality or circumferentially spaced apertures;

a plurality of pots, each being arranged in one of said apertures and projecting therefrom in an upstream direction from said flame tube;

radially spaced walls defining an annular diffusing passageway for receiving all compressed air from the compressor of the gas turbine engine, said annular diffusing passageway extending in a downstream direction and terminating adjacent to upstream ends of said pots;

a plurality of circumferentially spaced tubular ducts within the annular diffusing passageway, there being one of said tubular ducts for each of said pots, each of said tubular ducts being contiguous with at least a part of the spaced walls of said annular diffusing passageway, said tubular ducts extending from a position intermediate the ends of said annular diffusing passageway downstream to a position contacting an upstream end of one of said pots;

and a fuel burner positioned in each of said tubular ducts whereby some of the compressed air delivered to said annular diffusing passageway flows through said tubular ducts into said pots and said flame tube together with fuel from said fuel burner while the remaining compressed air delivered to said annular diffusing passageway flows between adjacent circumferentially spaced tubular ducts and from the downstream end of said diffusing passageway over the upstream end plate of said flame tube.

2. Combustion equipment as claimed in claim 1 in which the radially spaced walls of said annular diffusing passageway are shaped to conform at least in part to an exterior surface of each of said tubular ducts over a majority of the length of each of said tubular ducts where said tubular ducts are contiguous with said spaced walls.

3. Combustion equipment as claimed in claim 1 in which each fuel burner is integral with each of said tubular ducts and in which a fuel pipe to each said burner is removable from the combustion equipment while the fuel burner is retained within its corresponding tubular duct.

4. Combustion equipment as claimed in claim 1 wherein said annular diffusing passageway and said flame tube are relatively movable.

5. Combustion equipment as claimed in claim 4 wherein each said tubular duct and each said pot are relatively movable.

6. Combustion equipment as claimed in claim 4 wherein each said pot and said flame tube are relatively movable.

* * * * *